United States Patent [19]

Hebert

[11] Patent Number: 5,045,987
[45] Date of Patent: Sep. 3, 1991

[54] VEHICLE HEADLAMP POSITION ADJUSTMENT ASSEMBLY

[75] Inventor: David J. Hebert, Royal Oak, Mich.
[73] Assignee: Eaton Corporation, Cleveland, Ohio
[21] Appl. No.: 592,435
[22] Filed: Oct. 4, 1990
[51] Int. Cl.⁵ .............................................. F21M 3/18
[52] U.S. Cl. .................................... 362/421; 362/66; 362/428
[58] Field of Search .............. 362/61, 66, 80, 418, 362/419, 420, 421, 427, 428

[56] References Cited

U.S. PATENT DOCUMENTS

| | | | |
|---|---|---|---|
| 4,621,307 | 11/1986 | Weber | 362/66 |
| 4,839,785 | 6/1989 | Ohishi | 362/427 |
| 4,894,754 | 1/1990 | Levilain | 362/421 |

Primary Examiner—Ira. S. Lazarus
Assistant Examiner—Sue Hagarman
Attorney, Agent, or Firm—A. E. Chrow

[57] ABSTRACT

A vehicular headlamp position adjustment assembly (50) is provided that features a ball and socket type connection between an adjustment screw (8) and a support member (18) for adjusting position of a headlamp (2) mounted on a movable frame (4) relative to a fixed frame (6). Support member (18) is adapted to be received through an opening in either movable frame (4) or fixed frame (6) and be releasably secured thereto by means of a clip such as a "U" shaped clip (32). Adjustment screw (8) has a boss (14) adapted to be received in a cavity (16) within support member (18) and is preferably adapted to be rotated from either end.

5 Claims, 1 Drawing Sheet

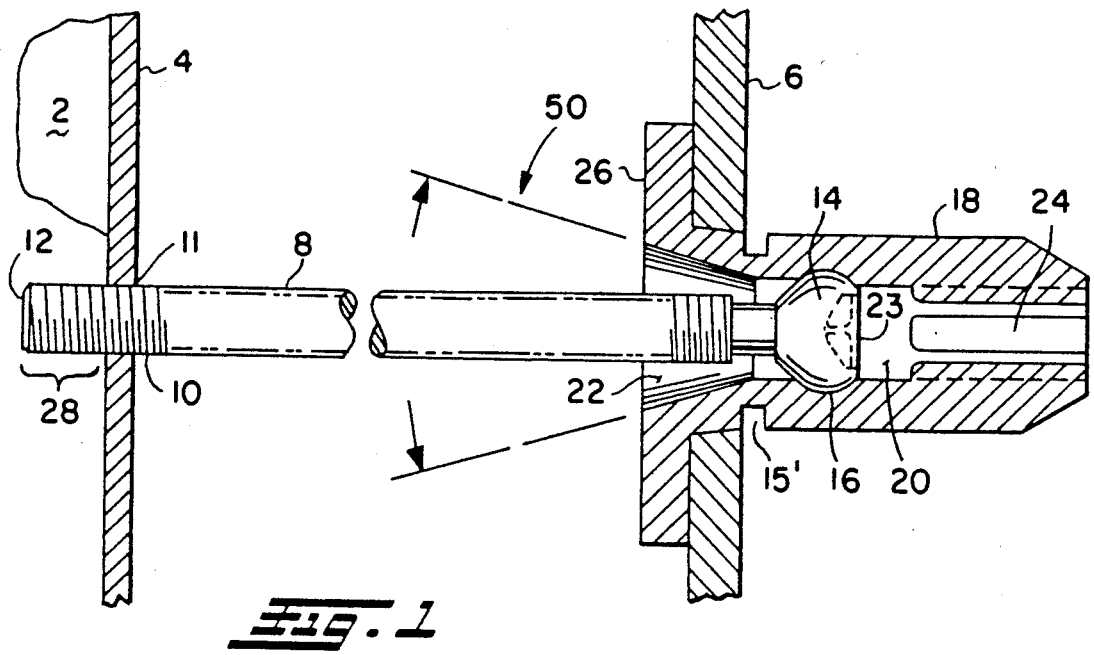
_Fig. 1_
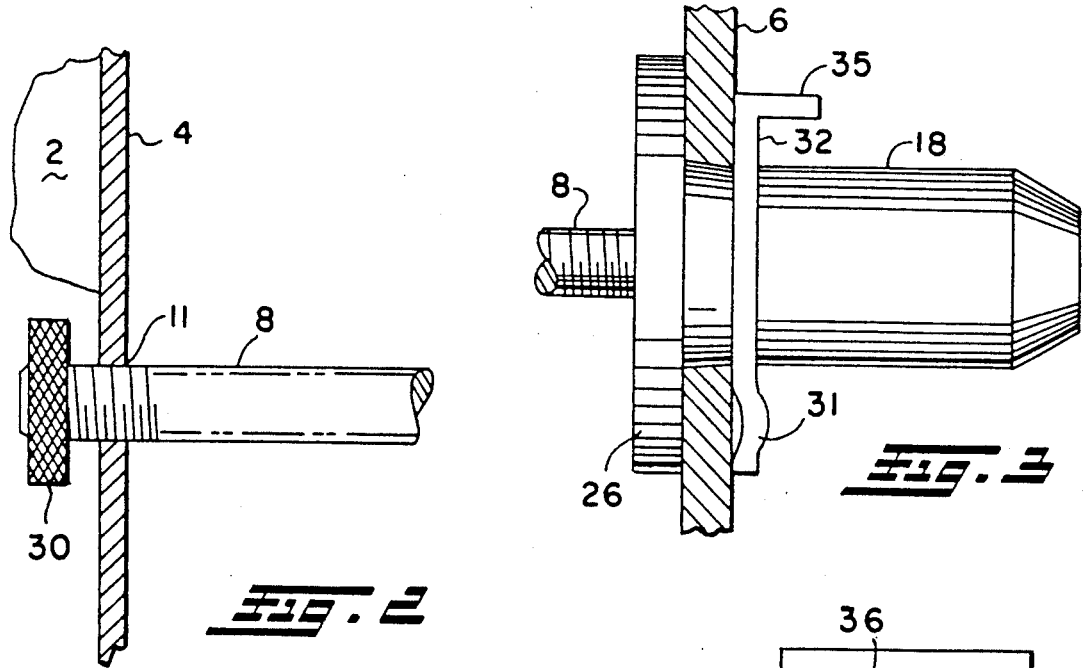
_Fig. 2_
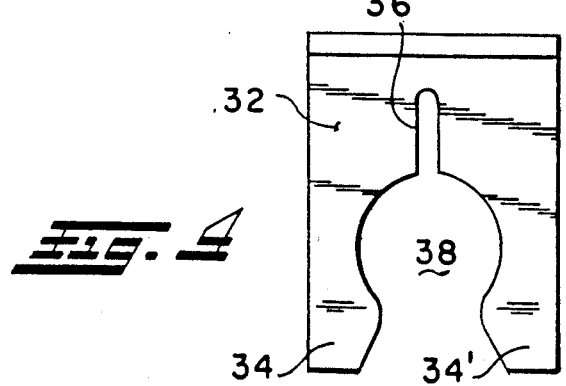
_Fig. 3_
_Fig. 4_

VEHICLE HEADLAMP POSITION ADJUSTMENT ASSEMBLY

This invention relates generally to a vehicular headlamp position adjustment assembly and more particularly to an assembly featuring a rotary screw that is pivotably mounted at one end and adapted to be rotated from either end to effect positioning of the headlamp.

BACKGROUND OF THE INVENTION

A variety of mechanisms have been developed over the years for positioning the headlamp of a vehicle.

The headlamp is characteristically mounted on a movable frame and positioned relative to a fixed frame by rotating threaded adjustment screws extending therebetween and positioned so as to provide the amount of horizontal and vertical positioning desired.

Although complex gear box arrangements have been more recently devised to provide angulated adjustment screw members for positioning vehicular headlamps such as disclosed in U.S. Pat. Nos. 4,796,949 and 4,735,534, the disclosures of which are incorporated herein by reference, the present invention is more closely related to and represents an improvement over the straight elongated type adjustment screw members that are pivotably mounted at one end either to the fixed or to the movable frame such as disclosed in U.S. Pat. Nos. 4,318,161; 4,707,769 and RE 32,088, the disclosures of which are incorporated herein by reference.

The pivotably mounted straight type adjustment screws heretofor employed however have been designed to be rotated at only one end which greatly reduces their usefulness in many applications and further require complex arrangements for providing a ball and socket type coupling between the adjustment screw and a support member and for securing the support member to one of the fixed and movable frames.

SUMMARY OF THE INVENTION

Accordingly, it is an object of this invention to provide a vehicular headlamp position adjustment assembly.

It is another object of this invention to provide a vehicular headlamp position adjustment assembly that features an adjustment screw that is pivotably coupled at one end to a support member that is releasably secured to either the fixed or the movable frame in a simple and effective manner.

It is still another object of this invention to provide a vehicular headlamp position adjustment assembly featuring an adjustment screw that is pivotably mounted at one end and is capable of being rotated at either end so as to greatly enhance its usefulness in various applications.

BRIEF DESCRIPTION OF THE DRAWINGS

FIG. 1 is a central cross-sectional view of a vehicular headlamp positioning assembly 50 made in accordance with the invention;

FIG. 2 is a portion of the cross-sectional view of assembly 50 of FIG. 1;

FIG. 3 is a partial side elevation view of assembly 50 of FIG. 1 and;

FIG. 4 is a front view of a clip 32 shown in FIG. 3.

DESCRIPTION OF SOME PREFERRED EMBODIMENTS

Assembly 50 of FIG. 1 is operative to adjust the position of a vehicular headlamp 2 mounted on movable frame 4 relative to a fixed frame 6 on the vehicle.

Assembly 50 has an adjustment screw 8 that has external threads 10 that extend away from first end 12 for at least a portion of its length. Screw 8 has a boss 14 at its opposite end that is configured to enable screw 8 to pivot thereat and is adapted to be received into cavity 16 of support member 18 that is releasably secured to fixed frame 6.

Threads 10 may extend for virtually the entire length from end 12 to boss 14 where such is desired. Threads 10 are adapted the threadingly engage threads in threaded opening 11 in movable frame 4 so that rotation of screw 8 in opposite direction correspondly causes movable frame 4 to move to the riht and left as viewed in FIG. 1 according to the thread direction.

Cavity 16 is configured to lockingly receive boss 14 thereinto to provide a ball and socket type coupling between screw 8 and support member 18 such that screw 8 is able to pivot within cavity 16 relative to support member 18.

Boss 14 includes means for receiving an adjustment tool for rotating screw 8. Preferably, the means is in the form of at least one groove 23 adapted to receive the end of an adjustment tool such as a screw driver therein and more preferably where there are two transverse grooves that are configured to receive the end a Phillips screw driver well known in the art.

Support member 18 has an access opening 20 that communicates with cavity 16 and extends in one direction through support member 18 and an opening 22 that communicates with cavity 16 and extends in an opposite direction through support member 18.

Opening 22 is adapted to enable screw 8 to pivot a predetermined amount relative to support member 18 and is preferably in the form of a cone defined by walls of support member 18 that taper radially outwardly in a direction away from cavity 16 so as to enable screw 8 to pivot to the extent shown by the arrows in FIG. 1. The ability of screw 8 to pivot relative support member 18 is advantageous to account for mis-alignment situations as well as to lessen vibration from being transferred from fixed frame 6 to movable frame 4 upon which headlamp 2 is mounted.

Screw 8 preferably includes means for securing a rotor member to end 12 after it has been received through opening 11. The rotor member, which is operative to enable one to more easily rotate screw 8, may be a knurled handle or knob 30 such as shown in FIG. 2 that is adapted to be pressed onto the end of screw 8 and be secured thereto by knurling 28. Other means may be used for securing a rotor member to end 12 of screw 8 after it has been received through opening 11.

Although support member 18 is shown in the FIGURES as being releasably secured to fixed frame 6, it may be releasably secured to movable frame 4 with threaded opening 11 being in fixed frame 6 where such is of advantage for a particular application and both types of such installations may further be employed in the same application where such is of advantage.

Support member 18 is adapted to be received through an opening in either movable frame 4 or fixed frame 6, as the case may be, and then removably secured thereto by means of a clip such as clip 32 shown in FIG. 4.

Support member 18 preferably has a cylindrical portion and an abutment portion such as a transverse flange portion 26 that abuts against one side of the frame having the opening through which the cylindrical portion of support member 18 is received. Support member 18 further preferably includes a groove and more preferably two diammetrically opposed open sided grooves such as grooves 15 and 15' shown in FIG. 1 that are in substantial registration with the opposite side of the frame when flange 26 abuts thereagainst. Grooves 15 and 15' are adapted to receive facing edges of spaced-apart legs 34 and 34' of clip 32 shown in FIG. 4.

Clip 32, as shown in FIGS. 3 and 4 and previously described, is preferably a "U"shaped clip having a central open area referenced by numeral 38 between spaced-apart legs 34 and 34'. Clip 32 also preferably includes an overhanging lip 35 for ease in inserting and removing the clip from grooves 15 and 15' and further preferably includes a slit or slot 36 intersection with opening 38 and adapted to enable legs 34 and 34' to spread apart from each other to enable the cylindrical portion of support member 18 to be received into open area 38. Clip 32 preferably has a warped cross-section such as indicated by reference numeral 31 in FIG. 3 to provide a spring action operative to urge flange 26 of support member 18 against frame 6 when the facing edges of legs 34 and 34' are received into grooves 15 and 15' respectively.

Although the assembly of the invention may be made from any material suitable for such vehicular applications, the adjustment screw is preferably made from a suitable steel coated with a suitable corrosion resistant plating and the support member is preferably made from a suitable plastic material such as a suitable nylon having sufficient resilience to enable boss 14 to be lockingly received into cavity 16 and the clip is preferably made from a suitable resilient sheet metal material.

The present invention provides an effective way to releasably secure the support member to either the fixed or movable frame of the vehicle headlamp installation and further provides for the adjustment screw to be rotated from either end.

What is claimed:

1. An assembly for adjusting position of a vehicular headlamp mounted on a movable frame relative to a fixed frame on the vehicle, said assembly comprising:
   a screw having external threads extending over at least a portion of the length away from a first end thereof and adapted to threadingly engage threads of a threaded opening in one of the fixed and movable frames so as to cause the movable frame to move in opposite directions for adjusting the position thereof in response to rotation of the screw in opposite directions, said screw having a boss at an opposite end thereof that is configured to enable the screw to pivot thereabout and is provided with means for receiving an adjustment tool for rotating the screw;
   a support member adapted to extend through an opening in the other of the fixed and movable frames and be removably secured thereto by a clip;
   a cavity disposed within the support member, said cavity configured to receive the screw boss thereinto to provide a ball and socket type coupling operative to enable the screw to pivot threat relative the support member;
   a first access opening extending in one direction through the support member and communicating with the cavity, said access opening adapted to receive the adjustment tool therethrough for receipt by the boss adjustment means; and
   a second opening extending in an opposite direction through the support member and communicating with the cavity, said opening adapted to receive the screw boss therethrough and lockingly couple the screw to the support member and enable the screw to pivot thereat a predetermined amount relative thereto.

2. The assembly of claim 1 wherein the means for removably securing the support member to one of the fixed and movable frames is provided by the support member having an abutment surface that abuts against one side of the frame when the support member is received through the frame opening and the support member has a groove in the outer surface thereof that is positioned for substantial registration with the opposite side of the frame and is adapted to receive a portion of the clip thereinto to secure the support member to the frame.

3. The assembly of claim 2 wherein the support member has two of said grooves on opposite sides thereof and the clip is a "U" shaped clip having a pair of spaced-apart legs having facing edges adapted to be respectively received into the grooves.

4. The assembly of claim 1 wherein the first end of the screw includes means for enabling a rotor member to be secured thereto after the first end has been received through the threaded opening so as to enable the screw to be rotated thereby.

5. The assembly of claim 4 wherein the means for securing the rotor member to the screw first end is provided by the screw having a knurled surface for a predetermined distance from the first end and the rotor member is adapted to be secured to the screw thereby.

* * * * *